US012133227B2

(12) United States Patent
Zhao (10) Patent No.: US 12,133,227 B2
(45) Date of Patent: Oct. 29, 2024

(54) FEEDBACK METHOD, FEEDBACK APPARATUS AND STORAGE MEDIUM (71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 333 days.

(21) Appl. No.: 17/775,547

(22) PCT Filed: Nov. 8, 2019

(86) PCT No.: PCT/CN2019/116792
§ 371 (c)(1),
(2) Date: May 9, 2022

(87) PCT Pub. No.: WO2021/088010
PCT Pub. Date: May 14, 2021

(65) Prior Publication Data
US 2022/0394704 A1  Dec. 8, 2022

(51) Int. Cl.
*H04W 72/21* (2023.01)
*H04L 1/1812* (2023.01)
(Continued)

(52) U.S. Cl.
CPC .......... *H04W 72/21* (2023.01); *H04L 1/1812* (2013.01); *H04L 5/0053* (2013.01); *H04W 72/569* (2023.01); *H04W 4/40* (2018.02)

(58) Field of Classification Search
CPC ..... H04W 72/21; H04W 72/569; H04W 4/40; H04W 4/46; H04L 1/1812; H04L 5/0053; H04L 1/1861; H04L 1/1896; H04L 5/0055
See application file for complete search history.

(56) References Cited

U.S. PATENT DOCUMENTS

2018/0206176 A1   7/2018 Panteleev et al.
2020/0053766 A1*  2/2020 Chien ................... H04L 5/0053
(Continued)

FOREIGN PATENT DOCUMENTS

CN   109075921 A   12/2018
CN   109644073 A   4/2019
(Continued)

OTHER PUBLICATIONS

ISA State Intellectual Property Office of the People's Republic of China, International Search Report Issued in Application No. PCT/CN2019/116792, Jul. 29, 2020, WIPO, (4p).

(Continued)

*Primary Examiner* — Kibrom T Hailu
(74) *Attorney, Agent, or Firm* — Arch & Lake LLP; Zhangyuan Ji; Hao Tan (57) ABSTRACT Feedback methods, feedback apparatuses and storage mediums are provided. A feedback method includes that: a terminal determines a first physical uplink control channel resource for transmitting first feedback information and a second physical uplink control channel resource for transmitting second feedback information are overlapped in time domain, where the first physical uplink control channel resource corresponds to a first resource set and the second physical uplink control channel resource corresponds to a second resource set; the terminal determines a third physical uplink control channel resource from the first resource set or the second resource set, and transmits the first feedback information and the second feedback information in a combination by the third physical uplink control channel resource.

18 Claims, 4 Drawing Sheets

(51) Int. Cl.
  *H04L 5/00* (2006.01)
  *H04W 72/566* (2023.01)
  *H04W 4/40* (2018.01)

(56) References Cited

U.S. PATENT DOCUMENTS

| | | | |
|---|---|---|---|
| 2020/0068599 A1 | 2/2020 | Yang et al. | |
| 2020/0106564 A1* | 4/2020 | Rungta | H04L 5/0057 |
| 2020/0145144 A1* | 5/2020 | Hosseini | H04W 72/21 |
| 2020/0146037 A1* | 5/2020 | Park | H04L 1/1812 |
| 2021/0058950 A1 | 2/2021 | Yang et al. | |
| 2021/0321380 A1 | 10/2021 | Zhao | |

FOREIGN PATENT DOCUMENTS

| | | |
|---|---|---|
| CN | 109661791 A | 4/2019 |
| CN | 109792326 A | 5/2019 |
| CN | 109792369 A | 5/2019 |
| CN | 109792594 A | 5/2019 |
| CN | 110166208 A | 8/2019 |
| CN | 110268662 A | 9/2019 |
| EP | 3905569 A1 | 11/2021 |
| KR | 20190038991 A | 4/2019 |
| WO | 2019157713 A1 | 8/2019 |
| WO | 2019194660 A1 | 10/2019 |
| WO | 2020029278 A1 | 2/2020 |

OTHER PUBLICATIONS

State Intellectual Property Office of the People's Republic of China, Office Action and Search Report Issued in Application No. 201980002821.X, Dec. 8, 2021, (Submitted with Machine/Partial Translation), (34p).

Huawei et al, "Sidelink resource allocation mode 1", 3GPP TSG RAN WG1 Meeting #98bis R1-1910055, Chongqing, China, Oct. 14-20, 2019, (19p).

LG Electronics, "Discussion on NR sidelink resource allocation for Mode 1", 3GPP TSG RAN WG1 #98bis Meeting R1-1910778, Chongqing, China, Oct. 14-20, 2019, (11p).

Xiaomi Communications, "On Mode 1 resource allocation of V2x communications", 3GPP TSG RAN WG1 #98bis R1-1911288, Chongqing, China, Oct. 14-20, 2019 , (2p).

Then Second CNOA issued in Application No. 201980002821.X, , dated Jun. 29, 2022, with Machine English Translation, (15p).

INOA issued in Application No. 202247031522, dated Sep. 19, 2022, with English Translation, (5p).

ISA State Intellectual Property Office of the People's Republic of China, Written Opinion of the International Searching Authority Issued in Application No. PCT/CN2019/116792, dated Jul. 29, 2020, with Machine/Partial English Translation(6p).

State Intellectual Property Office of the People's Republic of China, Decision of Rejection Issued in Application No. 201980002821X, dated Nov. 30, 2022, with Machine English Translation, (16p).

Extended European Search Report issued in Application No. 19951376.3, dated Jun. 28, 2023,(7p).

* cited by examiner

FEEDBACK METHOD, FEEDBACK APPARATUS AND STORAGE MEDIUM

CROSS-REFERENCE TO RELATED APPLICATION

The present application is a U.S. National Stage of International Application No. PCT/CN2019/116792 filed on Nov. 8, 2019, the contents of which are incorporated herein by reference in their entireties for all purposes.

TECHNICAL FIELD

The present disclosure relates to the field of communication technologies, and in particular to feedback method, feedback apparatus and storage medium.

BACKGROUND

As technologies such as autopilot develop in recent years, in order to support new Vehicle to Everything (V2X) services, new requirements are proposed for the performance of the V2X technology. Supporting new V2X communication services and scenarios by using 5G technology has been planned as an important content of Rel16 by 3GPP.

In the New Radio (NR) V2X technology, a network device allocates a time-frequency resource to a data sender through downlink signaling. The data sender uses the allocated time-frequency resource to perform uplink transmission and physical layer Hybrid Automatic Repeat request (HARQ) feedback. For example, the network device respectively configures Physical Uplink Control Channel (PUCCH) time-frequency resources for transmitting a sidelink physical layer HARQ feedback and a downlink data HARQ feedback. The data sender determines a PUCCH resource for transmitting the downlink data HARQ feedback based on Downlink control information (DCI) for scheduling downlink data and determines a PUCCH time-frequency resource for transmitting the sidelink HARQ feedback based on the DCI for scheduling sidelink data transmission.

SUMMARY

In order to overcome the problems in the related arts, the present disclosure provides feedback methods, feedback apparatuses and storage mediums.

According to a first aspect of the present disclosure, there is provided a feedback method. The method is applied to a terminal and includes: determining that a first physical uplink control channel resource for transmitting first feedback information and a second physical uplink control channel resource for transmitting second feedback information are overlapped in time domain, where the first physical uplink control channel resource corresponds to a first resource set and the second physical uplink control channel resource corresponds to a second resource set; determining a third physical uplink control channel resource from the first resource set or the second resource set, and transmitting the first feedback information and the second feedback information in a combination by the third physical uplink control channel resource.

According to a second aspect of the present disclosure, there is provided a feedback method. The method is applied to a network device and includes: determining that a first physical uplink control channel resource for transmitting first feedback information and a second physical uplink control channel resource for transmitting second feedback information are overlapped in time domain, where the first physical uplink control channel resource corresponds to a first resource set and the second physical uplink control channel resource corresponds to a second resource set; determining a third physical uplink control channel resource from the first resource set or from the second resource set, and receiving the first feedback information and the second feedback information by using the third physical uplink control channel resource.

According to a third aspect of the present disclosure, there is provided a feedback apparatus including: a processor and a memory configured to store processor-executable instructions. Further, when the processor executes the processor-executable instructions, the processor is configured to perform operations including: determining that a first physical uplink control channel resource for transmitting first feedback information and a second physical uplink control channel resource for transmitting second feedback information are overlapped in time domain, where the first physical uplink control channel resource corresponds to a first resource set and the second physical uplink control channel resource corresponds to a second resource set; determining a third physical uplink control channel resource from the first resource set or the second resource set, and transmitting the first feedback information and the second feedback information in a combination by the third physical uplink control channel resource.

It should be understood the above general descriptions and subsequent detailed descriptions are merely illustrative and explanatory rather than limiting of the present disclosure.

BRIEF DESCRIPTION OF THE DRAWINGS

The accompanying drawings illustrate examples consistent with the present disclosure and serve to explain the principles of the present disclosure together with the description.

DETAILED DESCRIPTION OF THE EMBODIMENTS

Embodiments will be described in detail herein, with illustrations of the embodiments represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

The feedback method provided by the embodiments of the present disclosure may be applied to a communication scenario where sidelink communication is performed between two devices, for example, applied to a V2X scenario from a vehicle to another node or the like, where V represents a vehicle-mounted device, and X represents any object interacting with the vehicle-mounted device. At present, the X mainly includes a vehicle-mounted device, a handheld device, a traffic roadside infrastructure and a network. The information modes of V2X interaction include Vehicle to Vehicle (V2V) interaction, Vehicle to Infrastructure (V2I) interaction, Vehicle to Pedestrian (V2P) interaction, Vehicle to Network (V2N) interaction and the like. In the present disclosure, the communication scenario where sidelink communication is performed between two devices may also be a device to device (D2D) communication scenario. In the embodiments of the present disclosure, the devices performing sidelink communication may include devices with wireless communication function, such as a handheld device, a vehicle-mounted device, a wearable device and a computing device, or, other devices connecting to a wireless modem, various types of user equipments (UEs), a mobile station (MS), a terminal, a terminal equipment and the like. For convenience of descriptions, the embodiments of the present disclosure will be described below with a scenario where sidelink communication is performed between vehicle-mounted devices, where the vehicle-mounted devices performing sidelink communication includes a vehicle-mounted device serving a data sender and a vehicle-mounted device serving as a data receiver.

However, when the PUCCH resource determined by the data sender for transmitting the downlink data HARQ feedback is overlapped with the PUCCH time-frequency resource for transmitting the sidelink HARQ feedback, how to transmit feedback information is still pending now.

The technical solutions provided by the embodiments of the present disclosure may include the following beneficial effects: when a first physical uplink control channel resource for transmitting first feedback information and a second physical uplink control channel resource for transmitting second feedback information are overlapped in time domain, a third physical uplink control channel resource is determined to transmit the first feedback information and the second feedback information in a combination, thus determining the feedback information transmission resource.

Figure 1:
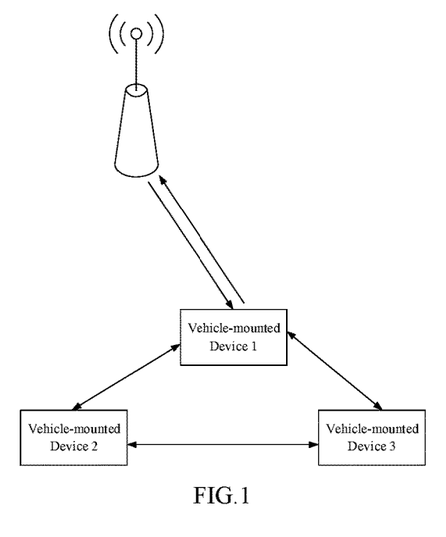
FIG. 1 is a structural schematic diagram illustrating a wireless communication system according to some embodiments of the present disclosure.

FIG. 1 is a schematic diagram illustrating a scenario where sidelink communication is performed between vehicle-mounted devices. A network device configures various transmission parameters for data transmission for a vehicle-mounted device 1. The vehicle-mounted device 1 serves as a data sender, a vehicle-mounted device 2 serves as a data receiver and the two perform sidelink communication. Links performing communication between the network device and the vehicle-mounted device are uplink and downlink, and a link between a vehicle-mounted device and a vehicle-mounted device is sidelink. In the Cellular-Vehicle to Everything (C-V2X) technology, the communication between a vehicle-mounted device and another device may be mediate transferred through a base station or core network, that is, communication is performed by using uplink and downlink between a terminal device and a base station in the original cellular network. Alternatively, communication may also be performed by directly using a sidelink between devices. Compared with Uu interface communication, the sidelink communication features short delay and low overhead and so on, and thus is very suitable for sidelink communications between a vehicle-mounted device and another peripheral device geographically located nearby.

V2X sidelink communications in Long Term Evolution (LTE) can only support some basic safety V2X applications, for example, exchanging Basic Safety Messages (BSM) such as Cooperative Awareness Messages (CAM) or Decentralized Environmental Notification Message (DENM), performing voice broadcast communication and the like. As technologies such as autopilot develop in recent years, in order to support new Vehicle to Everything (V2X) services, new requirements are proposed for the performance of the V2X technology. Supporting new V2X communication services and scenarios by using 5G NR technology has been planned as an important content of Rel16 by 3GPP. 3GPP SA1 (Service Requirement) workgroup has set up some new service requirements to be satisfied by V2X communications, including Vehicles Platooning, Extended Sensors, Advanced Driving, and Remote Driving. Generally, NR V2X sidelink needs to provide higher communication rate, shorter communication delay and more reliable communication quality.

For unicast and multicast services of sidelink communication, use of a sidelink physical layer Hybrid Automatic Repeat reQuest (HARQ) feedback retransmission mechanism is supported. For the unicast service, a data receiver feeds back Acknowledgement (ACK) upon correct reception of data (correct decoding of data), and feeds back Negative Acknowledgement (NACK) upon incorrect reception of data (error occurring to data decoding). For the multicast service, two HARQ feedback retransmission methods are supported. In one method, the data receiver feeds back NACK only at the time of incorrect reception, otherwise, feeds back no signals. In the other method, each data receiver feeds back ACK upon correct reception and feeds back NACK upon incorrect reception.

In the related arts, NR V2X supports Model resource allocation method. The network device may allocate a time-frequency resource to a terminal serving as a data sender through downlink signaling. The terminal serving as a data sender uses the allocated time-frequency resource to send sidelink control information and sidelink data. According to specific downlink signaling, there will be three time-frequency resource allocation methods as follows.

A. Type1 configured grant: a network device sends time-frequency resource information to a terminal through a semi-static downlink signaling (e.g., Radio Resource Control, RRC, signaling) to configure the terminal with one group of periodic time-frequency resources for sidelink control/data transmission.

B. Type2 configured grant: a network device sends a semi-static downlink signaling to a terminal to configure the terminal with a periodic time-frequency resource for sidelink transmission; but, the size and position of the specific time-frequency resource in each period will be notified to the terminal by a base station sending downlink control information (DCI).

C. Dynamic resource allocation (dynamically-scheduled): a network device allocates the time-frequency resource for sidelink transmission to a terminal by sending DCI.

When a terminal uses the model resource allocation method, the terminal serving as a data sender is supported to transmit sidelink HARQ feedback information to the network device over a Physical Uplink Control Channel (PUCCH). For Type2 configured grant or dynamically-scheduled time-frequency resource allocation method, the selection and configuration of the PUCCH for transmitting the sidelink HARQ feedback information may reuse the selection and configuration of the PUCCH for transmitting the downlink data HARQ. But, the PUCCH resource for transmitting the sidelink HARQ and the PUCCH resource for transmitting downlink data HARQ may be configured respectively.

For the configuration of the PUCCH resource of the sidelink HARQ, the terminal is configured with at most four groups of PUCCH resources (for convenience of descriptions, in the embodiments of the present disclosure, a plurality of groups of PUCCH resources configured for the sidelink HARQ are referred to as sidelink HARQ PUCCH resource). Each PUCCH resource in the downlink HARQ PUCCH resources corresponds to a payload size of a different sidelink HARQ feedback. When the sidelink HARQ selects PUCCH for transmission, one group of PUCCH resources are selected from a first resource set based on the payload size of the sidelink HARQ, and then based on an indication in the DCI of the Type2 configured grant or an indication in the DCI of the dynamically scheduling, one PUCCH in the selected group of PUCCHs is selected for transmission of sidelink HARQ.

When the PUCCH resource for transmitting the downlink data HARQ is configured, the terminal is configured with at most four additional groups of PUCCH resources (for convenience of descriptions, in the embodiments of the present disclosure, a plurality of groups of PUCCH resources configured for sidelink data are referred to as downlink HARQ PUCCH resource). Each PUCCH resource in the sidelink HARQ PUCCH resources corresponds to a payload size of different uplink control information (UCI). When the downlink data HARQ selects a downlink HARQ PUCCH resource for transmission, one group of downlink HARQ PUCCH resources are firstly selected based on the payload size of the sidelink data HARQ, and then based on an indication in the DCI for scheduling downlink data transmission, one in the selected group of downlink HARQ PUCCH resources is selected.

In addition, when the PUCCH resource selected for the downlink data HARQ is overlapped in time domain with the PUCCH for sending other UCI such as Scheduling Request (SR) or Channel State Information (CSI), the downlink data HARQ and other UCI may be combined for transmission on one PUCCH. The method of selecting the PUCCH is as follows: one group of PUCCH resources are selected based on the payload size of the combined UCI, and then, based on an indication in the DCI for scheduling downlink data transmission, one PUCCH resource in the selected group of PUCCH resources is selected.

In a case of use of the above resource allocation manner, there will be a case that the PUCCH resource selected for the downlink data HARQ is overlapped in time domain with the PUCCH resource selected for the sidelink data HARQ. In this case, how to select a PUCCH resource to transmit the downlink data HARQ and the sidelink HARQ will become a technical problem to be solved.

In view of this, an embodiment of the present disclosure provides a feedback method. In this method, when the PUCCH resources for transmitting a plurality pieces of feedback information are overlapped in time domain, one PUCCH resource is selected to transmit the plurality pieces of feedback information in a combination.

In the present disclosure, any two pieces of different feedback information in a plurality pieces of feedback information are respectively referred to as first feedback information and second feedback information. A PUCCH resource for transmitting the first feedback information is referred to as a first PUCCH resource and a PUCCH resource for transmitting the second feedback information is referred to as a second PUCCH resource. The first PUCCH resource belongs to a first resource set, and the second PUCCH resource belongs to a second resource set. Each PUCCH resource in the first resource set is a PUCCH resource specially used to transmit the first feedback information, and each PUCCH resource in the second resource set is a PUCCH resource specially used to transmit the second feedback information.

In an embodiment, for example, the first feedback information is sidelink data HARQ feedback information, and the second feedback information is downlink data HARQ feedback information. The first resource set includes sidelink HARQ PUCCH resources and the second resource set includes downlink HARQ PUCCH resources. When the PUCCH resource for transmitting the UCI including the downlink data HARQ feedback information is overlapped in time domain with the PUCCH resource for transmitting the sidelink data HARQ, the UCI and the sidelink HARQ may be combined for transmission on one PUCCH resource. For another example, when the PUCCH selected for the HARQ transmission in Model sidelink transmission such as the Type2 configured grant or the dynamically-scheduled is overlapped in time domain with the PUCCH selected for the UCI including the downlink HARQ feedback, the sidelink HARQ feedback and the UCI may be combined for transmission on one PUCCH resource.

However, since PUCCH resources are respectively configured for the downlink data HARQ information and the sidelink data HARQ feedback information, and the DCI for scheduling downlink data and the DCI for scheduling sidelink data transmission both indicate PUCCH, how to select a PUCCH resource for transmitting a combination of UCI and sidelink data HARQ is also one of problems to be solved.

In the embodiments of the present disclosure, there is provided a selection manner of selecting a PUCCH resource for transmitting the first feedback information and the second feedback information in a combination.

Figure 2:
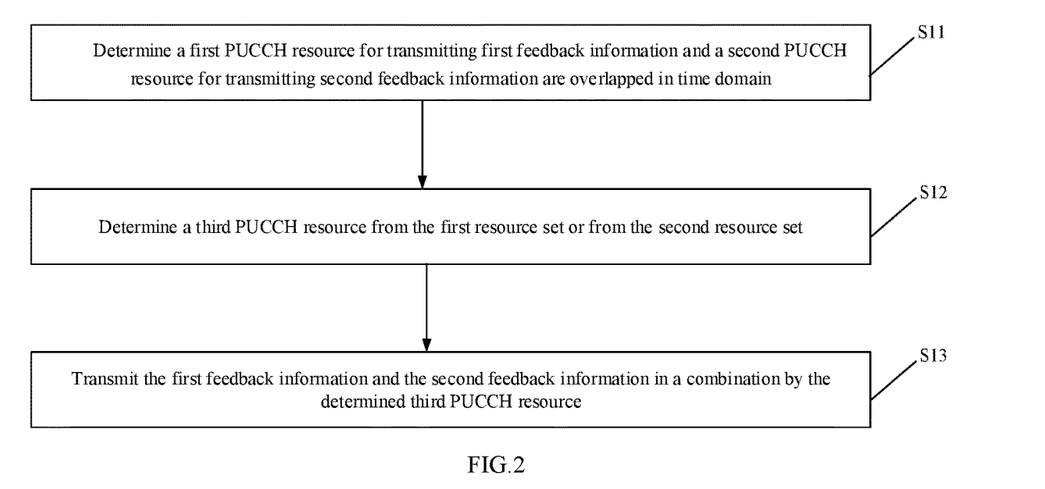
FIG. 2 is a flowchart illustrating a feedback method according to an embodiment of the present disclosure.

FIG. 2 is a flowchart illustrating a feedback method according to embodiments of the present disclosure. As shown in FIG. 2, the feedback method is applied to a terminal and includes the following steps.

At step S11, it is determined that a first PUCCH resource for transmitting first feedback information and a second PUCCH resource for transmitting second feedback information are overlapped in time domain.

In an embodiment of the present disclosure, the first PUCCH resource corresponds to a first resource set and the second PUCCH resource corresponds to a second resource set.

At step S12, a third PUCCH resource is determined from the first resource set or from the second resource set.

In embodiments of the present disclosure, the third PUCCH resource may be understood as a PUCCH resource for transmitting the first feedback information and the second feedback information in a combination.

At step S13, the first feedback information and the second feedback information are transmitted in a combination by the determined third PUCCH resource.

In an embodiment of the present disclosure, the process of determining the third PUCCH resource in the above embodiment will be described below in combination with practical applications.

In an embodiment of the present disclosure, whether to determine the third PUCCH resource from the first resource set or determine the third PUCCH resource from the second resource set is determined based on configuration information or configuration parameter.

In an embodiment of the present disclosure, the third PUCCH resource may be determined based on configuration information. The configuration information is used to indicate determining the third PUCCH resource from the first resource set or determining the third PUCCH resource from the second resource set. A terminal determines the third PUCCH resource from the first resource set or from the second resource set based on the configuration information. When the configuration information is used to indicate determining the third PUCCH resource from the first resource set, the terminal may determine the third PUCCH resource from the first resource set. When the configuration information is used to indicate determining the third PUCCH resource from the second resource set, the terminal may determine the third PUCCH resource from the second resource set. The configuration information may be configuration information stored in the terminal or configuration information received from other communication device, which is not limited in all embodiments of the present disclosure. In another embodiment of the present disclosure, the third PUCCH resource may also be determined based on configuration parameter. For example, the third PUCCH resource is determined according to receiving times of the DCI of data transmissions corresponding to the first feedback information and the second feedback information. For another example, the third PUCCH resource is determined according to priorities of data transmissions (e.g., priority of quality of service, QoS) corresponding to the first feedback information and the second feedback information. The configuration parameter may be a configuration parameter stored in the device or a configuration parameter received from other communication device, which is not limited in all embodiments of the present disclosure.

In an example, when determining the third PUCCH resource based on the receiving times of the DCI of the data transmissions corresponding to the first feedback information and the second feedback information, a resource set corresponding to data transmission with later receiving time of DCI may be determined. For example, when a receiving time of first DCI for scheduling first data transmission corresponding to the first feedback information is later than a receiving time of second DCI for scheduling data transmission corresponding to the second feedback information, the third PUCCH resource is determined from the first resource set. When the receiving time of the second DCI for scheduling the data transmission corresponding to the second feedback information is later than the receiving time of the first DCI for scheduling the data transmission corresponding to the first feedback information, the third PUCCH resource is determined from the second resource set.

For example, when the first feedback information is sidelink data HARQ feedback information and the second feedback information is downlink data HARQ feedback information, a receiving time of a DCI for scheduling a downlink transmission and corresponding to a downlink transmission HARQ feedback to be transmitted is compared with a receiving time of a DCI for scheduling a sidelink transmission and corresponding to a sidelink transmission HARQ feedback to be transmitted, so as to determine the DCI with a later receiving time. If the DCI with a later receiving time is the DCI for scheduling downlink transmission, the third PUCCH resource may be determined from the second resource set. If the DCI with a later receiving time is the DCI for scheduling sidelink data, the third PUCCH resource may be determined from the first resource set.

In another example, when the third PUCCH resource is determined based on the priorities of the data transmissions corresponding to the first feedback information and the second feedback information, a resource set corresponding to a data transmission with a higher priority may be determined. In some examples, a resource set corresponding to a data transmission with a lower priority may also be determined. For example, when the priority of the data transmission corresponding to the first feedback information is higher than the priority of the data transmission corresponding to the second feedback information, the third PUCCH resource is determined from the first resource set. When the priority of the data transmission corresponding to the second feedback information is higher than the priority of the data transmission corresponding to the first feedback information, the third PUCCH resource is determined from the second resource set. In some examples, a resource set corresponding to the data transmission with a lower priority may also be determined.

In an embodiment of the present disclosure, the third PUCCH resource may be determined based on the combination of the above embodiments. For example, when the priorities of the data transmissions corresponding to the first feedback information and the second feedback information are same, the third PUCCH resource may be determined further based on the receiving times of the DCI, for example, a resource set corresponding to the data transmission with a later DCI receiving time or a resource set corresponding to the data transmission with an earlier DCI receiving time may be determined.

For example, when the first feedback information is sidelink data HARQ feedback information and the second feedback information is downlink data HARQ feedback information, a priority of the downlink transmission corresponding to the downlink transmission HARQ feedback to be transmitted is compared with a priority of the sidelink transmission corresponding to the sidelink transmission HARQ feedback to be transmitted, so as to determine a transmission with a higher priority. If the determined transmission is the downlink transmission, the third PUCCH resource may be determined from the second resource set. If the determined transmission is the sidelink transmission, the third PUCCH resource may be determined from the first resource set. If their priorities are equal, the receiving time of the DCI for scheduling the downlink transmission and corresponding to the downlink transmission HARQ feedback to be transmitted is further compared with the receiving time of the DCI for scheduling the sidelink transmission and corresponding to the sidelink transmission HARQ feedback to be transmitted, so as to determine the DCI with a later receiving time.

In an embodiment of the present disclosure, when the third PUCCH resource is determined from the first resource set, one group of PUCCH resources may be determined from the first resource set according to the payload size obtained by combining information to be transmitted on the first PUCCH and information to be transmitted on the second PUCCH, and then the third PUCCH resource is determined according to the determined group of PUCCH resources. In an embodiment of the present disclosure, one PUCCH resource in the determined group of PUCCH resources may be determined as the third PUCCH resource. In an embodiment of the present disclosure, according to an indication in the DCI for scheduling the data transmission corresponding to the information to be transmitted (first feedback information and other uplink control information) on the first PUCCH, one PUCCH resource in the determined group of PUCCH resources may be determined as the third PUCCH resource. In an embodiment of the present disclosure, whether to use the first resource set or the second resource set may be determined, and then one group of PUCCH resources are determined from the determined first resource set or second resource set based on the payload size obtained by combining the information to be transmitted, and then one PUCCH resource in the determined group of PUCCH resources may be determined as the third PUCCH resource according to an indication in the DCI for scheduling the data transmission corresponding to the information to be transmitted (first feedback information and other uplink control information) on the first PUCCH. For example, when the first feedback information is sidelink data HARQ feedback information and the second feedback information is downlink data HARQ feedback information, one corresponding group of PUCCH resources may be determined from the sidelink HARQ PUCCH resources according to a payload size obtained by combining the sidelink data HARQ feedback information and the downlink data HARQ feedback information, and one PUCCH in the group of PUCCH resources is determined for transmitting the combined information according to the indication in the DCI for scheduling the sidelink transmission and corresponding to the sidelink transmission HARQ feedback to be transmitted.

In an embodiment of the present disclosure, when the third PUCCH resource is determined from the second resource set, according to a payload size obtained by combining the information to be transmitted on the first PUCCH and the information to be transmitted on the second PUCCH, one group of PUCCH resources may be determined from the second resource set, and then the third PUCCH resource may be determined based on the determined group of PUCCH resources. In an embodiment of the present disclosure, one PUCCH resource in the determined group of PUCCH resources may be determined as the third PUCCH resource. In an embodiment of the present disclosure, according to the indication in the DCI for scheduling the data transmission corresponding to the second feedback information in the information to be transmitted (second feedback information and other uplink control information) on the second PUCCH, one PUCCH resource in the determined group of PUCCH resources may be determined as the third PUCCH resource. In an embodiment of the present disclosure, whether to use the first resource set or the second resource set may be determined, and then one group of PUCCH resources may be determined from a determined first resource set or determined second resource set based on the payload size obtained by combining the information to be transmitted, and then one PUCCH resource in the determined group of PUCCH resources may be determined as the third PUCCH resource according to an indication in the DCI for scheduling the data transmission corresponding to the second feedback information in the information to be transmitted (second feedback information and other uplink control information) on the second PUCCH. For example, when the first feedback information is sidelink data HARQ feedback information and the second feedback information is downlink data HARQ feedback information, according to a payload size obtained by combining the sidelink data HARQ feedback information and the downlink data HARQ feedback information, one corresponding group of PUCCH resources may be determined in the downlink HARQ PUCCH resources and one PUCCH in the determined group of PUCCH resources may be determined for transmitting combined information according to the indication in the DCI for scheduling the downlink transmission and corresponding to the downlink transmission HARQ feedback to be transmitted.

In an embodiment of the present disclosure, when the first PUCCH resource for transmitting the first feedback information and the second PUCCH resource for transmitting the second feedback information are overlapped in time domain, one resource set is selected from the first resource set and the second resource set, and then one group of PUCCH resources may be determined in the selected resource set according to the payload size obtained by combining, and one PUCCH resource in the group of PUCCH resources may be determined as the third PUCCH resource based on the indication in the DCI to transmit the first feedback information and the second feedback information in a combination, so as to determine the PUCCH resource for transmitting the first feedback information and the second feedback information in a combination.

Figure 3:
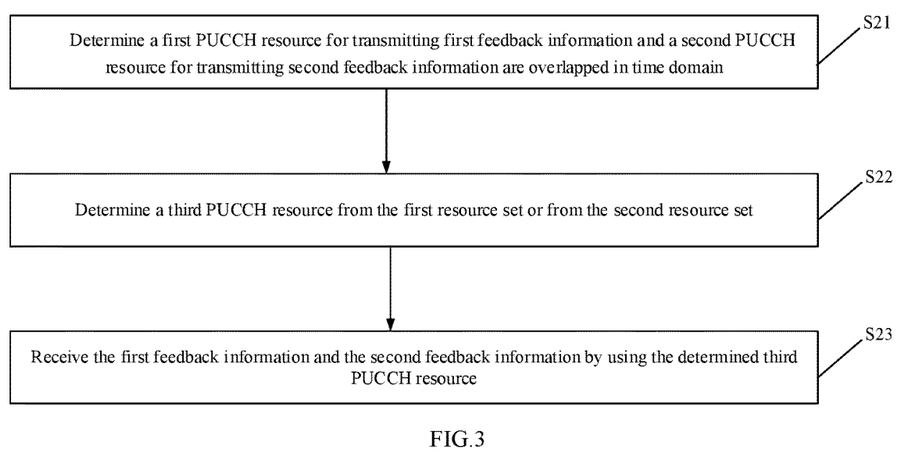
FIG. 3 is a flowchart illustrating another feedback method according to an embodiment of the present disclosure.

FIG. 3 is flowchart illustrating a feedback method according to an embodiment of the present disclosure. As shown in FIG. 3, the feedback method is applied to a network device and includes the following steps.

At step S21, a first PUCCH resource for transmitting first feedback information and a second PUCCH resource for transmitting second feedback information are overlapped in time domain is determined.

In an embodiment of the present disclosure, the first PUCCH resource corresponds to a first resource set and the second PUCCH resource corresponds to a second resource set.

At step S22, a third PUCCH resource is determined from the first resource set or the second resource set.

In an embodiment of the present disclosure, the third PUCCH resource may be understood as a PUCCH resource for transmitting the first feedback information and the second feedback information in a combination.

At step S23, the first feedback information and the second feedback information are received by using the determined third PUCCH resource.

In an embodiment of the present disclosure, a process in which the network device determines the third PUCCH resource is similar to the process in which the above terminal determines the third PUCCH resource, and the process may be referred to above relevant descriptions and will not be repeated here.

The feedback method provided by the embodiments of the present disclosure may be applied to an interaction process between a terminal and a network device. In the implementation process of the interaction between the terminal and the network device, the terminal may send feedback information as shown in FIG. 2, and the network device may receive the feedback information as shown in FIG. 3. In the implementation process of the interaction between the terminal and the network device, the terminal determines the PUCCH resource to transmit the first feedback information and the second feedback information in a combination, and the network device determines the PUCCH resource to receive the first feedback information and the second feedback information in a combination. The above process may be referred to the relevant descriptions of the above embodiments and will not be repeated here.

Based on the same concept, embodiments of the present disclosure further provide a feedback apparatus.

It may be understood that, the feedback apparatus provided by the embodiments of the present disclosure includes corresponding hardware structures and/or software modules for executing various functions so as to achieve the above functions. In combination with units and algorithm steps exemplified in the embodiments of the present disclosure, the embodiments of the present disclosure may be implemented by hardware or combination of hardware and computer software. Whether a particular function is executed by hardware or by driving hardware using computer software will depend on the specific applications and design constraints of the technical solutions. Those skilled in the art may execute the described functions for each specific application by a different method but the implementation shall not be considered as exceeding the scope of the technical solutions of the embodiments of the present disclosure.

Figure 4:
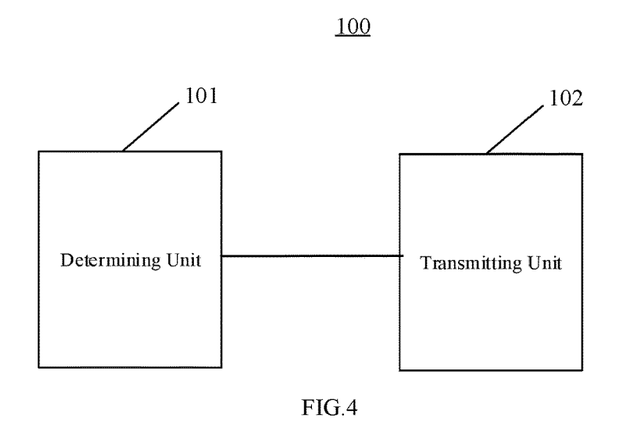
FIG. 4 is a block diagram illustrating a feedback apparatus according to an embodiment of the present disclosure.

FIG. 4 is a block diagram illustrating a feedback apparatus according to an embodiment of the present disclosure. As shown in FIG. 4, the feedback apparatus 100 may be applied to a terminal. The feedback apparatus 100 includes a determining unit 101 and a transmitting unit 102.

The determining unit 101 is configured to determine a first PUCCH resource for transmitting first feedback information and a second PUCCH resource for transmitting second feedback information are overlapped in time domain, where the first PUCCH resource belongs to a first resource set and the second PUCCH resource belongs to a second resource set. The determining unit 101 is configured to determine a third PUCCH resource from a first resource set or a second resource set. The transmitting unit 102 is configured to transmit the first feedback information and the second feedback information in a combination by using the third PUCCH resource.

In an implementation, the determining unit 101 is configured to determine the third PUCCH resource from the first resource set or the second resource set in the following manner:
  based on configuration information, determining the third PUCCH resource from the first resource set or the second resource set; where the configuration information is used to indicate determining the third PUCCH resource from the first resource set or determining the third PUCCH resource from the second resource set.

In another implementation, the determining unit 101 is configured to determine the third PUCCH resource from the first resource set or the second resource set in the following manner:
  when a receiving time of first downlink control information for scheduling data transmission corresponding to the first feedback information is later than a receiving time of second downlink control information for scheduling data transmission corresponding to the second feedback information, the third PUCCH resource is determined from the first resource set; when the receiving time of the second downlink control information for scheduling the data transmission corresponding to the second feedback information is later than the receiving time of the first downlink control information for scheduling the data transmission corresponding to the first feedback information, the third PUCCH resource is determined from the second resource set.

In another implementation, the determining unit 101 is configured to determine the third PUCCH resource from the first resource set or the second resource set in the following manner:
  when a priority of the data transmission corresponding to the first feedback information is higher than a priority of the data transmission corresponding to the second feedback information, the third PUCCH resource is determined from the first resource set; when the priority of the data transmission corresponding to the second feedback information is higher than the priority of the data transmission corresponding to the first feedback information, the third PUCCH resource is determined from the second resource set.

In another implementation, the determining unit 101 is configured to determine the third PUCCH resource from the first resource set or the second resource set in the following manner:
  according to a payload size obtained by combining information to be transmitted on the first physical uplink control channel and information to be transmitted on the second physical uplink control channel, one group of PUCCH resources are determined from the first resource set or the second resource set; the third PUCCH resource is determined according to the determined group of PUCCH resources.

In another implementation, the determining unit 101 is configured to determine the third PUCCH resource according to a determined group of PUCCH resources in the following manner: according to an indication in downlink control information for scheduling the information to be transmitted on the first PUCCH or an indication in downlink control information for scheduling the information to be transmitted on the second PUCCH, one PUCCH resource is determined from one group of PUCCH resources as the third PUCCH resource.

In another implementation, the first feedback information is sidelink data Hybrid Automatic Repeat reQuest (HARQ) feedback information and the second feedback information is downlink data HARQ feedback information.

Figure 5:
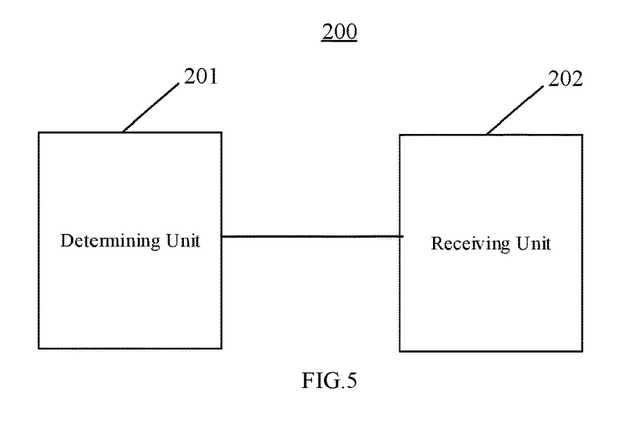
FIG. 5 is a block diagram illustrating another feedback apparatus according to an embodiment of the present disclosure.

FIG. 5 is a block diagram illustrating a feedback apparatus according to an embodiment of the present disclosure. As shown in FIG. 5, the feedback apparatus 200 may be applied to a network device. The feedback apparatus 200 includes a determining unit 201 and a receiving unit 202.

The determining unit 201 is configured to determine a first PUCCH resource for transmitting first feedback information and a second PUCCH resource for transmitting second feedback information are overlapped in time domain, where the first PUCCH resource belongs to a first resource set and the second PUCCH resource belongs to a second resource set. The determining unit 201 is configured to determine a third PUCCH resource from the first resource set or the second resource set. The receiving unit 202 is configured to receive the first feedback information and the second feedback information by using the third PUCCH resource.

In an implementation, the determining unit 201 is configured to determine the third PUCCH resource from the first resource set or the second resource set in the following manner:

based on configuration information, determining the third PUCCH resource from the first resource set or the second resource set; where the configuration information is used to indicate determining the third PUCCH resource from the first resource set or determining the third PUCCH resource from the second resource set.

In another implementation, the determining unit 201 is configured to determine the third PUCCH resource from the first resource set or the second resource set in the following manner:

when a receiving time of first downlink control information for scheduling data transmission corresponding to the first feedback information is later than a receiving time of second downlink control information for scheduling data transmission corresponding to the second feedback information, the third PUCCH resource is determined from the first resource set; when the receiving time of the second downlink control information for scheduling the data transmission corresponding to the second feedback information is later than the receiving time of the first downlink control information for scheduling the data transmission corresponding to the first feedback information, the third PUCCH resource is determined from the second resource set.

In another implementation, the determining unit 201 is configured to determine the third PUCCH resource from the first resource set or the second resource set in the following manner:

when a priority of the data transmission corresponding to the first feedback information is higher than a priority of the data transmission corresponding to the second feedback information, the third PUCCH resource is determined from the first resource set; when the priority of the data transmission corresponding to the second feedback information is higher than the priority of the data transmission corresponding to the first feedback information, the third PUCCH resource is determined from the second resource set.

In another implementation, the determining unit 201 is configured to determine the third PUCCH resource from the first resource set or the second resource set in the following manner:

according to a payload size obtained by combining information to be transmitted on the first physical uplink control channel and information to be transmitted on the second physical uplink control channel, one group of PUCCH resources may be determined from the first resource set or the second resource set; the third PUCCH resource may be determined according to the determined group of PUCCH resources.

In another implementation, the determining unit 201 is configured to determine the third PUCCH resource according to a determined group of PUCCH resources in the following manner: according to an indication in downlink control information for scheduling the information to be transmitted on the first PUCCH or an indication in downlink control information for scheduling the information to be transmitted on the second PUCCH, one PUCCH resource is determined from one group of PUCCH resources as the third PUCCH resource.

In another implementation, the first feedback information is sidelink data Hybrid Automatic Repeat reQuest (HARQ) feedback information and the second feedback information is downlink data HARQ feedback information.

The specific manner in which various modules in the apparatus of the above embodiments of the present disclosure perform operations is already detailed in the method embodiments and will not be described in detail here.

Figure 6:
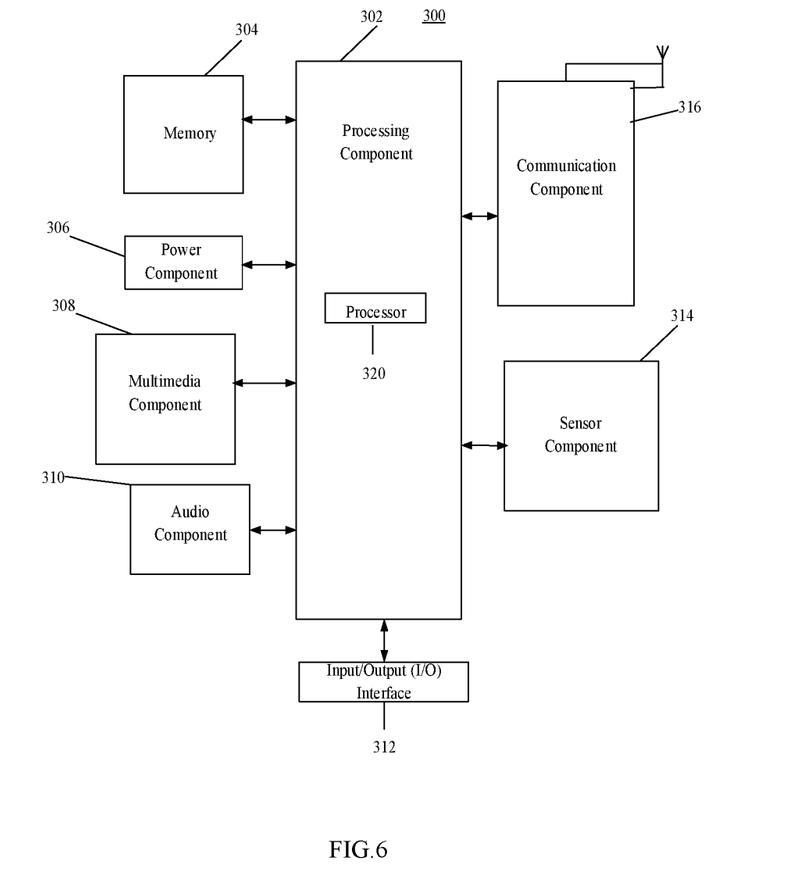
FIG. 6 is a block diagram illustrating an apparatus for feedback according to an embodiment of the present disclosure.

FIG. 6 is a block diagram illustrating an apparatus 300 for feedback according to an embodiment of the present disclosure. For example, the apparatus 300 may be a mobile phone, a computer, a digital broadcast terminal, a message transceiver, a game console, a tablet device, a medical device, a fitness device, a personal digital assistant, and the like.

With reference to FIG. 6, the apparatus 300 may include one or more of the following components: a processing component 302, a memory 304, a power component 306, a multimedia component 308, an audio component 310, an input/output (I/O) interface 312, a sensor component 314 and a communication component 316.

The processing component 302 generally controls overall operations of the apparatus 300, such as operations associated with display, phone calls, data communications, camera operations, recording operations and the like. The processing component 302 may include one or more processors 320 to execute instructions to complete all or part of the steps of the above methods. In addition, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the apparatus 300. Examples of such data include instructions for any application or method, contact data, phonebook data, messages, pictures, videos, and so on operated on the apparatus 300. The memory 304 may be implemented by any type of volatile or non-volatile storage devices or a combination of the volatile and non-volatile storage devices, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic, a compact disk and so on.

The power component 306 supplies power for different components of the apparatus 300. The power component 306 may include a power supply management system, one or more power supplies, and other components associated with generating, managing and distributing power for the apparatus 300.

The multimedia component 308 includes a screen that provides an output interface between the apparatus 300 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 308 includes a front camera and/or a rear camera. When the apparatus 300 is in an operation mode, such as a shooting mode or a video mode, the front camera and/or the rear camera may receive external multimedia data. Each of the front and rear cameras may be a fixed optical lens system or have a focal length and an optical zoom capability.

The audio component 310 is configured to output and/or input audio signals. For example, the audio component 310 includes a microphone (MIC) configured to receive an external audio signal when the apparatus 300 is in an operation mode, such as a call mode, a recording mode, and a voice recognition mode. The received audio signal may be further stored in the memory 304 or transmitted via the communication component 316. In some examples, the audio component 310 also includes a loudspeaker for outputting an audio signal.

The I/O interface 312 provides an interface between the processing component 302 and a peripheral interface module which may be a keyboard, a click wheel, a button, or the like. These buttons may include, but are not limited to a home button, a volume button, a start button, and a lock button.

The sensor component 314 includes one or more sensors for providing a status assessment in various aspects to the apparatus 300. For example, the sensor component 314 may detect an open/closed state of the apparatus 300, and the relative positioning of components, for example, the components may be a display and a keypad of the apparatus 300. The sensor component 314 may also detect a change in position of the apparatus 300 or a component of the apparatus 300, the presence or absence of a user in contact with the apparatus 300, the orientation or acceleration/deceleration of the apparatus 300 and a change in temperature of the apparatus 300. The sensor component 314 may include a proximity sensor configured to detect the presence of nearby objects without any physical contact. The sensor component 314 may also include a light sensor, such as a CMOS or CCD image sensor, for use in imaging applications. In some examples, the sensor component 314 may also include an acceleration sensor, a gyro sensor, a magnetic sensor, a pressure sensor, a temperature sensor and the like.

The communication component 316 is configured to facilitate wired or wireless communication between the apparatus 300 and other devices. The apparatus 300 may access a wireless network based on a communication standard, such as WiFi, 2G or 3G, or a combination of the above communication standards or the like. In an example, the communication component 316 receives broadcast signals or broadcast associated information from an external broadcast management system via a broadcast channel. In an example, the communication component 316 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, or other technologies.

In an example, the apparatus 300 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or other electronic elements for performing the above methods.

In an example, there is further provided a non-transitory computer readable storage medium including instructions, for example, a memory 304 including instructions, where the above instructions may be executed by the processor 320 of the apparatus 300 to complete the above method. For example, the non-transitory computer readable storage medium may be Read Only Memory (ROM), Random Access Memory (RAM), CD-ROM, magnetic tape, floppy disk and optical data storage device and the like.

Figure 7:
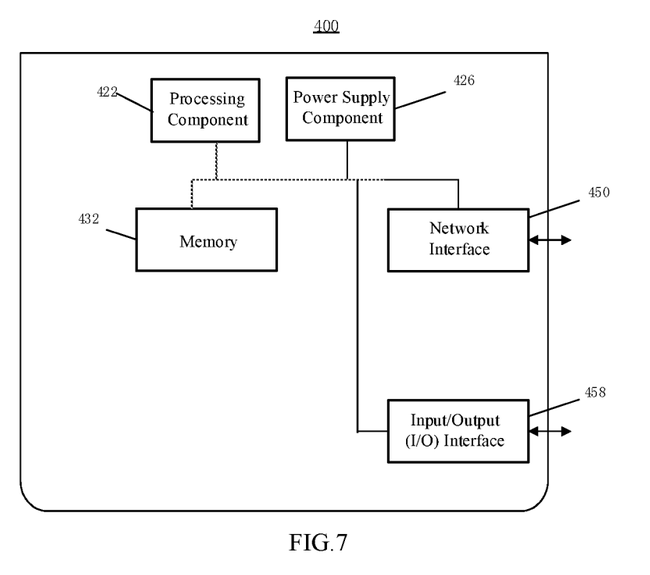
FIG. 7 is a block diagram illustrating another apparatus for feedback according to an embodiment of the present disclosure.

FIG. 7 is a block diagram of an apparatus 400 according to an embodiment of the present disclosure. For example, the apparatus 400 may be provided as a server. As shown in FIG. 7, the apparatus 400 may include a processing component 422 which further includes one or more processors and memory resources represented by a memory 432 for storing instructions executable by the processing component 422, for example, an application program. The application program stored in the memory 432 may include one or more modules, each of which corresponds to one set of instructions. Further, the processing component 422 is configured to execute instructions to perform the above methods.

The apparatus 400 further includes one power supply component 426 configured to execute power management for the apparatus 400, one wired or wireless network interface 450 configured to connect the apparatus 400 to a network, and one input/output (I/O) interface 458. The apparatus 400 may be operated based on an operating system stored in the memory 432, such as Windows Server™, Mac OS X™, Unix™, Linux™ and FreeBSD™.

In an example, there is further provided a non-transitory computer readable storage medium including instructions, for example, a memory 404 including instructions, where the above instructions may be executed by the processor 420 of the apparatus 400 to complete the above methods. For example, the non-transitory computer readable storage medium may be Read Only Memory (ROM), Random Access Memory (RAM), CD-ROM, magnetic tape, floppy disk and optical data storage device and the like.

It is further understood that "plurality" in the present disclosure refers to two or more and other quantifiers have the similar meanings. The "and/or" is used to describe association relationship of associated objects and represent three relationships, for example, A and/or B may represent that A exists alone, both A and B exist at the same time, and B exists alone. The character "/" generally represents an "or" relationship of the objects associated back and forth. The terms "a", "said" and "the" in singular forms are also meant to include plural form, unless otherwise clearly stated in the context.

It is to be understood that although different information may be described by using the terms such as first, second and the like. in the present disclosure, these information should not be limited to these terms. These terms are used only to distinguish the same type of information from each other rather than represent a specific sequence or degree of importance. Actually, the expressions of "first" and "second" and the like may be interchanged completely. For example, without departing from the scope of the present disclosure, the first information may also be referred to as the second information and similarly, the second information may also be referred to as the first information.

Further, it may be understood that operations are described in a specific sequence in the accompanying drawings in the embodiments of the present disclosure, but it shall not be understood as requiring these operations to be performed in the shown specific sequence or serial sequence, or all operations shown to be performed to achieve a desired result. In a specific environment, multi-task processing and parallel processing are possible and may also be advantageous.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as examples only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

In an implementation scenario, the feedback method of the embodiments of the present disclosure is applied. When the PUCCH selected for the HARQ transmission in Model sidelink transmission such as a Type2 configured grant or a dynamically-scheduled is overlapped in time domain with the PUCCH selected for the UCI including the downlink HARQ feedback, the sidelink HARQ feedback and the UCI may be combined for transmission on one PUCCH resource. The PUCCH resource may be selected as follows:

In a first example, according to a combined payload size, one corresponding group of PUCCH resources are selected from the downlink HARQ PUCCH resources and one PUCCH in the corresponding group of PUCCH resources is selected for transmitting the combined information according to an indication in the DCI for scheduling the downlink transmission and corresponding to the downlink transmission HARQ feedback to be transmitted.

In a second example, according to a combined payload size, one corresponding group of PUCCH resources are selected from the sidelink HARQ PUCCH resources and one PUCCH in the corresponding group of PUCCH resources is selected for transmitting the combined information according to an indication in the DCI for scheduling the sidelink transmission and corresponding to the sidelink transmission HARQ feedback to be transmitted.

In a third example, a receiving time of the DCI for scheduling downlink transmission and corresponding to the downlink transmission HARQ feedback to be transmitted is compared with a receiving time of the DCI for scheduling sidelink transmission and corresponding to sidelink transmission HARQ feedback to be transmitted, so as to select the DCI with a later receiving time; if the selected DCI is the DCI for scheduling the downlink transmission, the first example may be used, otherwise the second example may be used.

In a fourth example, a priority of the downlink transmission corresponding to the downlink transmission HARQ feedback to be transmitted is compared with a priority of the sidelink transmission corresponding to the sidelink transmission HARQ feedback to be transmitted, so as to select a transmission with a higher priority; if the selected transmission is the downlink transmission, the first example may be used; if the selected transmission is the sidelink transmission, the second example may be used; if the priorities are equal, the third example may be selected.

In embodiments of the present disclosure, one set to be used is firstly selected and then one group of resources are determined based on the combined payload size in the selected set, and then one PUCCH resource is determined in one group of PUCCH resources based on the indication in the DCI. Further, it may be understood that "plurality" in the present disclosure refers to two or more and other quantifiers have the similar meanings. The "and/or" is used to describe association relationship of associated objects and represent three relationships, for example, A and/or B may represent that A exists alone, both A and B exist at the same time, and B exists alone. The character "/" generally represents an "or" relationship of the objects associated back and forth. The terms "a", "said" and "the" in singular forms are also meant to include plural form, unless otherwise clearly stated in the context.

It is to further be understood that although different information may be described by using the terms such as first, second and the like. In the present disclosure, these information should not be limited to these terms. These terms are used only to distinguish the same type of information from each other rather than represent a specific sequence or degree of importance. Actually, the expressions of "first" and "second" and the like may be interchanged completely. For example, without departing from the scope of the present disclosure, the first information may also be referred to as the second information and similarly, the second information may also be referred to as the first information.

Further, it may be understood that operations are described in a specific sequence in the accompanying drawings in the embodiments of the present disclosure, but it shall not be understood as requiring these operations to be performed in the shown specific sequence or serial sequence, or all operations shown to be performed to achieve a desired result. In a specific environment, multi-task processing and parallel processing may also be advantageous.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as examples only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A feedback method, comprising:
  determining, by a terminal, that a first physical uplink control channel resource for transmitting first feedback information and a second physical uplink control channel resource for transmitting second feedback information are overlapped in time domain, wherein the first physical uplink control channel resource corresponds to a first resource set and the second physical uplink control channel resource corresponds to a second resource set;
  determining, by the terminal, a third physical uplink control channel resource from the first resource set or the second resource set, and
  transmitting, by the terminal, the first feedback information and the second feedback information in a combination by the third physical uplink control channel resource, wherein determining the third physical uplink control channel resource from the first resource set or the second resource set comprises one or both of:
  determining, in response to determining that a receiving time of first downlink control information for scheduling data transmission corresponding to the first feedback information is later than a receiving time of second downlink control information for scheduling data transmission corresponding to the second feedback information, the third physical uplink control channel resource from the first resource set, and
  determining, in response to determining that the receiving time of the second downlink control information for scheduling data transmission corresponding to the second feedback information is later than the receiving time of the first downlink control information for scheduling data transmission corresponding to the first feedback information, the third physical uplink control channel resource from the second resource set; or
  determining, in response to determining that a priority of data transmission corresponding to the first feedback information is higher than a priority of data transmission corresponding to the second feedback information, the third physical uplink control channel resource from the first resource set, and
  determining, in response to determining that the priority of data transmission corresponding to the second feedback information is higher than the priority of data transmission corresponding to the first feedback information, the third physical uplink control channel resource from the second resource set.

2. The feedback method of claim 1, wherein determining the third physical uplink control channel resource from the first resource set or the second resource set further comprises:
  determining, based on configuration information, the third physical uplink control channel resource from the first resource set or the second resource set;
  wherein the configuration information is used to indicate that the third physical uplink control channel resource is determined from the first resource set or from the second resource set.

3. The feedback method of claim 1, wherein determining the third physical uplink control channel resource from the first resource set or the second resource set further comprises:
  determining, according to a payload size obtained by combining information to be transmitted on the first physical uplink control channel resource and information to be transmitted on the second physical uplink control channel resource, one group of physical uplink control channel resources from the first resource set or the second resource set; and
  determining, according to the group of physical uplink control channel resources, the third physical uplink control channel resource.

4. The feedback method of claim 3, wherein determining, according to the group of physical uplink control channel resources, the third physical uplink control channel resource comprises:
  determining, according to an indication in downlink control information for scheduling information to be transmitted on the first physical uplink control channel resource or an indication in downlink control information for scheduling information to be transmitted on the second physical uplink control channel resource, one physical uplink control channel resource from the group of physical uplink control channel resources as the third physical uplink control channel resource.

5. The feedback method of claim 1, wherein
the first feedback information comprises sidelink data Hybrid Automatic Repeat reQuest (HARQ) feedback information, and
the second feedback information comprises downlink data HARQ feedback information.

6. A feedback method, comprising:
determining, by a network device, that a first physical uplink control channel resource for transmitting first feedback information and a second physical uplink control channel resource for transmitting second feedback information are overlapped in time domain, wherein the first physical uplink control channel resource corresponds to a first resource set and the second physical uplink control channel resource corresponds to a second resource set;
determining, by the network device, a third physical uplink control channel resource from the first resource set or from the second resource set, and
receiving, by the network device, the first feedback information and the second feedback information by using the third physical uplink control channel resource,
wherein determining the third physical uplink control channel resource from the first resource set or the second resource set comprises one or both of:
  determining, in response to determining that a receiving time of first downlink control information for scheduling data transmission corresponding to the first feedback information is later than a receiving time of second downlink control information for scheduling data transmission corresponding to the second feedback information, the third physical uplink control channel resource from the first resource set, and
  determining, in response to determining that the receiving time of the second downlink control information for scheduling data transmission corresponding to the second feedback information is later than the receiving time of the first downlink control information for scheduling data transmission corresponding to the first feedback information, the third physical uplink control channel resource from the second resource set; or
  determining, in response to determining that a priority of data transmission corresponding to the first feedback information is higher than a priority of data transmission corresponding to the second feedback information, the third physical uplink control channel resource from the first resource set, and
  determining, in response to determining that the priority of data transmission corresponding to the second feedback information is higher than the priority of data transmission corresponding to the first feedback information, the third physical uplink control channel resource from the second resource set.

7. The feedback method of claim 6, wherein determining the third physical uplink control channel resource from the first resource set or the second resource set further comprises:
  determining, based on configuration information, the third physical uplink control channel resource from the first resource set or the second resource set;

wherein the configuration information is used to indicate that the third physical uplink control channel resource is determined from the first resource set or from the second resource set.

8. The feedback method of claim 6, wherein determining the third physical uplink control channel resource from the first resource set or the second resource set further comprises:
determining, according to a payload size obtained by combining information to be transmitted on the first physical uplink control channel resource and information to be transmitted on the second physical uplink control channel resource, one group of physical uplink control channel resources from the first resource set or the second resource set; and
determining, according to the group of physical uplink control channel resources, the third physical uplink control channel resource.

9. The feedback method of claim 8, wherein determining, according to the group of physical uplink control channel resources, the third physical uplink control channel resource comprises:
determining, according to an indication in downlink control information for scheduling information to be transmitted on the first physical uplink control channel resource or an indication in downlink control information for scheduling information to be transmitted on the second physical uplink control channel resource, one physical uplink control channel resource from the group of physical uplink control channel resources as the third physical uplink control channel resource.

10. The feedback method of claim 6, wherein
the first feedback information comprises sidelink data Hybrid Automatic Repeat reQuest (HARQ) feedback information, and
the second feedback information comprises downlink data HARQ feedback information.

11. A feedback apparatus, comprising:
a processor; and
a memory configured to store processor-executable instructions;
wherein when the processor executes the processor-executable instructions, the processor is configured to perform operations comprising:
determining that a first physical uplink control channel resource for transmitting first feedback information and a second physical uplink control channel resource for transmitting second feedback information are overlapped in time domain, wherein the first physical uplink control channel resource corresponds to a first resource set and the second physical uplink control channel resource corresponds to a second resource set;
determining a third physical uplink control channel resource from the first resource set or the second resource set, and
transmitting the first feedback information and the second feedback information in a combination by the third physical uplink control channel resource,
wherein determining the third physical uplink control channel resource from the first resource set or the second resource set comprises one or both of:
determining, in response to determining that a receiving time of first downlink control information for scheduling data transmission corresponding to the first feedback information is later than a receiving time of second downlink control information for scheduling data transmission corresponding to the second feedback information, the third physical uplink control channel resource from the first resource set, and
determining, in response to determining that the receiving time of the second downlink control information for scheduling data transmission corresponding to the second feedback information is later than the receiving time of the first downlink control information for scheduling data transmission corresponding to the first feedback information, the third physical uplink control channel resource from the second resource set; or
determining, in response to determining that a priority of data transmission corresponding to the first feedback information is higher than a priority of data transmission corresponding to the second feedback information, the third physical uplink control channel resource from the first resource set, and
determining, in response to determining that the priority of data transmission corresponding to the second feedback information is higher than the priority of data transmission corresponding to the first feedback information, the third physical uplink control channel resource from the second resource set.

12. The feedback apparatus of claim 11, wherein determining the third physical uplink control channel resource from the first resource set or the second resource set further comprises:
determining, based on configuration information, the third physical uplink control channel resource from the first resource set or the second resource set;
wherein the configuration information is used to indicate that the third physical uplink control channel resource is determined from the first resource set or from the second resource set.

13. The feedback apparatus of claim 11, wherein determining the third physical uplink control channel resource from the first resource set or the second resource set further comprises:
determining, according to a payload size obtained by combining information to be transmitted on the first physical uplink control channel resource and information to be transmitted on the second physical uplink control channel resource, one group of physical uplink control channel resources from the first resource set or the second resource set; and
determining, according to the group of physical uplink control channel resources, the third physical uplink control channel resource.

14. The feedback apparatus of claim 13, wherein determining, according to the group of physical uplink control channel resources, the third physical uplink control channel resource comprises:
determining, according to an indication in downlink control information for scheduling information to be transmitted on the first physical uplink control channel resource or an indication in downlink control information for scheduling information to be transmitted on the second physical uplink control channel resource, one physical uplink control channel resource from the group of physical uplink control channel resources as the third physical uplink control channel resource.

15. The feedback apparatus of claim 11, wherein
the first feedback information comprises sidelink data Hybrid Automatic Repeat reQuest (HARQ) feedback information, and the second feedback information comprises downlink data HARQ feedback information.

16. A feedback apparatus, comprising:
a processor; and
a memory configured to store processor-executable instructions;
wherein when the processor executes the processor-executable instructions, the processor is configured to perform the feedback method according to claim 6.

17. A non-transitory computer readable storage medium, wherein, instructions in the storage medium are executed by a processor of a mobile terminal to perform the feedback method according to claim 1.

18. A non-transitory computer readable storage medium, wherein, instructions in the storage medium are executed by a processor of a network device to perform the feedback method according to claim 6.

* * * * *